(12) United States Patent
Suzaki

(10) Patent No.: US 11,795,736 B2
(45) Date of Patent: Oct. 24, 2023

(54) VEHICLE DOOR STRUCTURE

(71) Applicant: TOYOTA JIDOSHA KABUSHIKI KAISHA, Aichi-ken (JP)

(72) Inventor: Takahiro Suzaki, Toyota (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 489 days.

(21) Appl. No.: 17/170,915

(22) Filed: Feb. 9, 2021

(65) Prior Publication Data

US 2021/0254373 A1 Aug. 19, 2021

(30) Foreign Application Priority Data

Feb. 19, 2020 (JP) ................................. 2020-026212

(51) Int. Cl.
  *E05B 77/04* (2014.01)
  *B60J 5/04* (2006.01)
  *E05B 85/04* (2014.01)
  *E05B 83/38* (2014.01)
  *E05B 83/40* (2014.01)

(52) U.S. Cl.
  CPC ............. *E05B 77/04* (2013.01); *B60J 5/0433* (2013.01); *B60J 5/0479* (2013.01); *E05B 83/38* (2013.01); *E05B 83/40* (2013.01); *E05B 85/04* (2013.01)

(58) Field of Classification Search
  CPC .......... E05B 77/04; E05B 83/38; E05B 83/40; E05B 85/04; B60J 5/0433; B60J 5/0479
  See application file for complete search history.

(56) References Cited

U.S. PATENT DOCUMENTS

| 4,580,823 A * | 4/1986 | Yamada | ................... E05B 77/10 292/DIG. 46 |
| 6,616,214 B2 * | 9/2003 | Wattebled | ............... E05B 83/38 292/26 |
| 7,320,495 B2 * | 1/2008 | Menke | ................... B60J 5/0479 296/146.1 |
| 2005/0045402 A1 | 3/2005 | Armbruster et al. | |
| 2019/0135349 A1 | 5/2019 | Nusier et al. | |
| 2019/0193620 A1 | 6/2019 | Matsuoka et al. | |

FOREIGN PATENT DOCUMENTS

| JP | 200567595 A | 3/2005 |
| JP | 201157176 A | 3/2011 |
| JP | 2019116112 A | 7/2019 |

* cited by examiner

*Primary Examiner* — Joseph D. Pape
(74) *Attorney, Agent, or Firm* — HAUPTMAN HAM, LLP

(57) ABSTRACT

A vehicle door structure includes: a door having a door body defining a closed section with a door inner panel and a door outer panel; an engaging member configured to hold the door in a closed and stopped state by engaging with an engaged member; and a load transmitting member configured to, when a load in a direction perpendicular to a design surface on a vehicle cabin outer side of the door outer panel is input, transmit the load toward a base end side of the engaging member and apply a load to the base end side of the engaging member in an engagement direction of the engaging member with the engaged member.

10 Claims, 2 Drawing Sheets

VEHICLE DOOR STRUCTURE

CROSS-REFERENCE TO RELATED APPLICATION

This application claims priority to Japanese Patent Application No. 2020-026212 filed on Feb. 19, 2020, incorporated herein by reference in its entirety.

BACKGROUND

1. Technical Field

The present disclosure relates to a vehicle door structure.

2. Description of Related Art

A structure is known in which a door for opening and closing is provided at a door opening of a vehicle. For example, Japanese Unexamined Patent Application Publication No. 2019-116112 (JP 2019-116112 A) discloses a structure in which two sliding doors are provided adjacent to each other in a vehicle front-rear direction at a door opening on a side portion of a vehicle. In this disclosed structure, as an example, there is no center pillar on the side portion of the vehicle. Therefore, in such a structure, it is necessary to connect a mating portion between a front door and a rear door with an engaging portion (that is, an engaging member and an engaged member) of a door lock mechanism in the vehicle front-rear direction.

SUMMARY

However, there is room for improvement in such a structure in suppressing deformation of the door engaging portion side when a colliding body collides with the door from the vehicle cabin outer side.

The present disclosure provides a vehicle door structure capable of suppressing deformation of the door engaging portion side when a colliding body collides with the door from the vehicle cabin outer side.

A vehicle door structure of an aspect of the present disclosure includes: a door having a door body defining a closed section with a door inner panel and a door outer panel and configured to open and close a door opening of a vehicle; an engaging member provided on an outer edge portion of the door body and configured to hold the door in a closed and stopped state by engaging with an engaged member; and a load transmitting member configured to, when a load in a direction perpendicular to a design surface on a vehicle cabin outer side of the door outer panel is input, transmit the load toward a base end side of the engaging member and apply a load to the base end side of the engaging member in an engagement direction of the engaging member with the engaged member, the load transmitting member being provided on an interior of the door body such that a part of the load transmitting member is disposed on the base end side of the engaging member. Here, each of the engaging member and the engaged member is a part of a door locking mechanism.

According to the above aspect, the door opening of the vehicle is opened and closed by the door, and the engaging member provided on the outer edge of the door body is engaged with the engaged member to hold the door in the closed and stopped state. The load transmitting member is provided on the interior of the door body, and a part of the load transmitting member is disposed on the base end side of the engaging member. When a load in a direction perpendicular to a design surface on a vehicle cabin outer side of the door outer panel is input, the load transmitting member transmits the load toward the base end side of the engaging member and applies a load to the base end side of the engaging member in the engagement direction of the engaging member with the engaged member. Therefore, when the colliding body collides with the door from the vehicle cabin outer side, it is possible to suppress the load from acting in the direction of disengaging the engaging member and the engaged member, so that deformation of the door engaging portion side is suppressed.

In the above aspect, the vehicle door structure may include a second sliding door disposed adjacent to the door that is a first sliding door and configured to open and close the door opening together with the first sliding door. The second sliding door may be provided with the engaged member. The engaged member and the engaging member may be configured to be engaged with each other when both the first sliding door and the second sliding door are in the closed and stopped state.

According to the above configuration, when both the first sliding door and the second sliding door are in the closed and stopped state, the engaging member provided on the first sliding door and the engaged member provided on the second sliding door are engaged with each other. Even with such a structure, when a colliding body collides with the first sliding door from the vehicle cabin outer side, deformation of the engaging portion side of the first sliding door is suppressed by load transmission by the load transmitting member described above.

In the above aspect, the engaging member may be provided on an end portion side of the door in one direction of an upward direction, a downward direction, a left direction, and a right direction in a front view of the door, and the engagement direction may be set to coincide with the one direction. The load transmitting member may include an end wall portion, a first wall portion, a second wall portion, and a third wall portion. The end wall portion may be provided on an end portion side on the interior of the door body in the one direction and may be disposed on the base end side of the engaging member, and may be used for inputting the load to the base end side of the engaging member and facing the engaged member. The first wall portion may be configured such that a first end portion that is an end portion in a direction opposite to the one direction serves as a support point when a load is input from the vehicle cabin outer side. The second wall portion may extend so as to be inclined in the one direction toward a vehicle cabin inner side from a second end portion that is an end portion of the first wall portion in the one direction. The third wall portion may connect an end portion of the second wall portion on the vehicle cabin inner side and an end portion of the end wall portion on the vehicle cabin outer side, and may extend along the one direction.

According to the above configuration, when the load is input to the first wall portion, the first wall portion is likely to rotate with the first end portion serving as a support point, so that the end portion of the first wall portion in the one direction is likely to move in the one direction while moving toward the vehicle cabin inner side.

In the above aspect, the first wall portion may be disposed at a position that overlaps with the design surface on the vehicle cabin outer side of the door outer panel in a front view of the door. According to the above configuration, when the load in the direction perpendicular to the design surface of the door outer panel on the vehicle cabin outer side is input, the load at that time is input from the door outer panel to the first wall portion.

In the above aspect, the first wall portion may be inclined toward the vehicle cabin outer side in the one direction and may be configured to include a portion further on the vehicle cabin outer side than the end wall portion in a door thickness direction of the door.

According to the above configuration, when the first wall portion attempts to rotate with the first end portion serving as the support point, a load in the one direction is applied from the first wall portion to the third wall portion via the second wall portion, and a load in the one direction is also applied to the base end side of the engaging member from the third wall portion via the end wall portion. Here, since the engagement direction of the engaging member with the engaged member is set to coincide with the one direction, by applying the load in the one direction to the base end side of the engaging member as described above, the load can be applied to the base end side of the engaging member in the engagement direction.

Further, according to the above configuration, when a colliding body collides with the door from the vehicle cabin outer side, the collision load at that time can be efficiently transmitted to the base end side of the engaging member by the load transmitting member.

In the above aspect, the base end side of the engaging member may be fixed to a portion of the load transmitting member disposed on the base end side of the engaging member.

According to the above configuration, the base end side of the engaging member is fixed to the portion of the load transmitting member that is disposed on the base end side of the engaging member, so that when the colliding body collides with the door from the vehicle cabin outer side, the load can be applied more stably from the load transmitting member to the base end side of the engaging member.

In the above aspect, the load transmitting member may include a fourth wall portion that is bent from the first end portion of the first wall portion toward the vehicle cabin inner side and that extends to a vehicle cabin side vertical wall portion of the door inner panel and a flange portion that is bent from an end portion of the fourth wall portion on the vehicle cabin inner side and that is joined to the vehicle cabin side vertical wall portion. The first end portion may be supported by the vehicle cabin side vertical wall portion via the fourth wall portion and the flange portion and may be disposed on a door outer panel side on the interior of the door body. Here, to be "disposed on a door outer panel side" means to be disposed further on the door outer panel side than the center position in the door thickness direction.

According to the above configuration, the first end portion of the first wall portion is supported by the vehicle cabin side vertical wall portion of the door inner panel via the fourth wall portion and the flange portion, and functions as a support point when a load in the direction perpendicular to the design surface of the door outer panel on the vehicle cabin outer side is input. Here, the first end portion of the first wall portion is disposed not on the door inner panel side but on the door outer panel side on the interior of the door body, and the entire first wall portion is disposed on the door outer panel side. Therefore, when a colliding body collides with the door from the vehicle cabin outer side, the collision load at that time can be easily and quickly applied to the first wall portion.

In the above aspect, the load transmitting member may be composed of two members. The first wall portion may be a portion where the two members are overlapped and joined to each other.

According to the above configuration, the load transmitting member can be easily manufactured, and the deformation of the first wall portion can be easily suppressed when the colliding body collides with the door from the vehicle cabin outer side.

In the above aspect, the first end portion may be in contact with a vehicle cabin side vertical wall portion of the door inner panel and may be fixed to the vehicle cabin side vertical wall portion of the door inner panel.

In the above aspect, the base end side of the engaging member may be fixed to the end wall portion.

The above aspect of the present disclosure has an effect of suppressing deformation of the door engaging portion side when a colliding body collides with the door from the vehicle cabin outer side.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
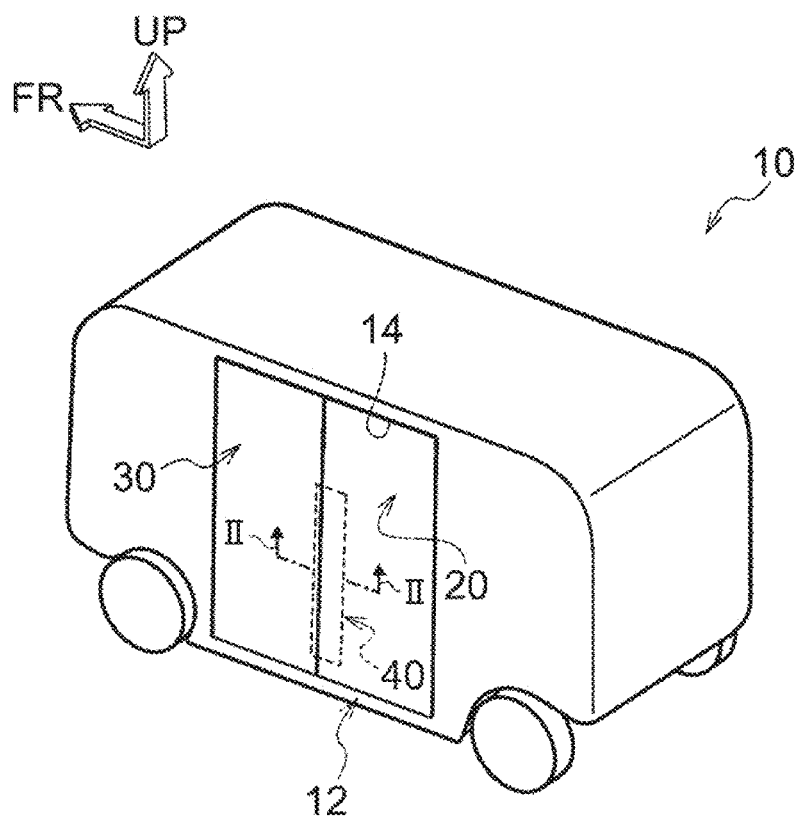
FIG. 1 is a schematic perspective view of a vehicle to which a vehicle door structure according to an embodiment of the present disclosure is applied.

A vehicle door structure according to an embodiment of the present disclosure will be described with reference to FIGS. 1 and 2. Note that, an arrow FR indicates a front side in a front-rear direction of a vehicle, an arrow UP indicates a vehicle upper side, and an arrow IN indicates an inner side in a width direction of the vehicle, which are appropriately shown in the drawings.

Configuration of Embodiment

FIG. 1 shows a schematic perspective view of a vehicle 10 to which the vehicle door structure according to the present embodiment is applied. The vehicle 10 is exemplified as a bus in the present embodiment. A door opening 14 is provided on a side portion 12 of the vehicle 10. The door opening 14 communicates the outside of the vehicle cabin with the inside of the vehicle cabin.

The rear portion of the door opening 14 of the vehicle 10 is opened and closed by a rear sliding door 20 serving as a door, especially as a first sliding door. The front portion of the door opening 14 is opened and closed by a front sliding door 30 serving as a second sliding door. That is, the front sliding door 30 is disposed adjacent to the rear sliding door 20, and is used as a door for opening and closing the door opening 14 together with the rear sliding door 20. The front sliding door 30 and the rear sliding door 20 are elements that are also understood as side doors, and are slidable along a vehicle front-rear direction. A detailed description of the mechanism for sliding the front sliding door 30 and the rear sliding door 20 will be omitted.

Figure 2:
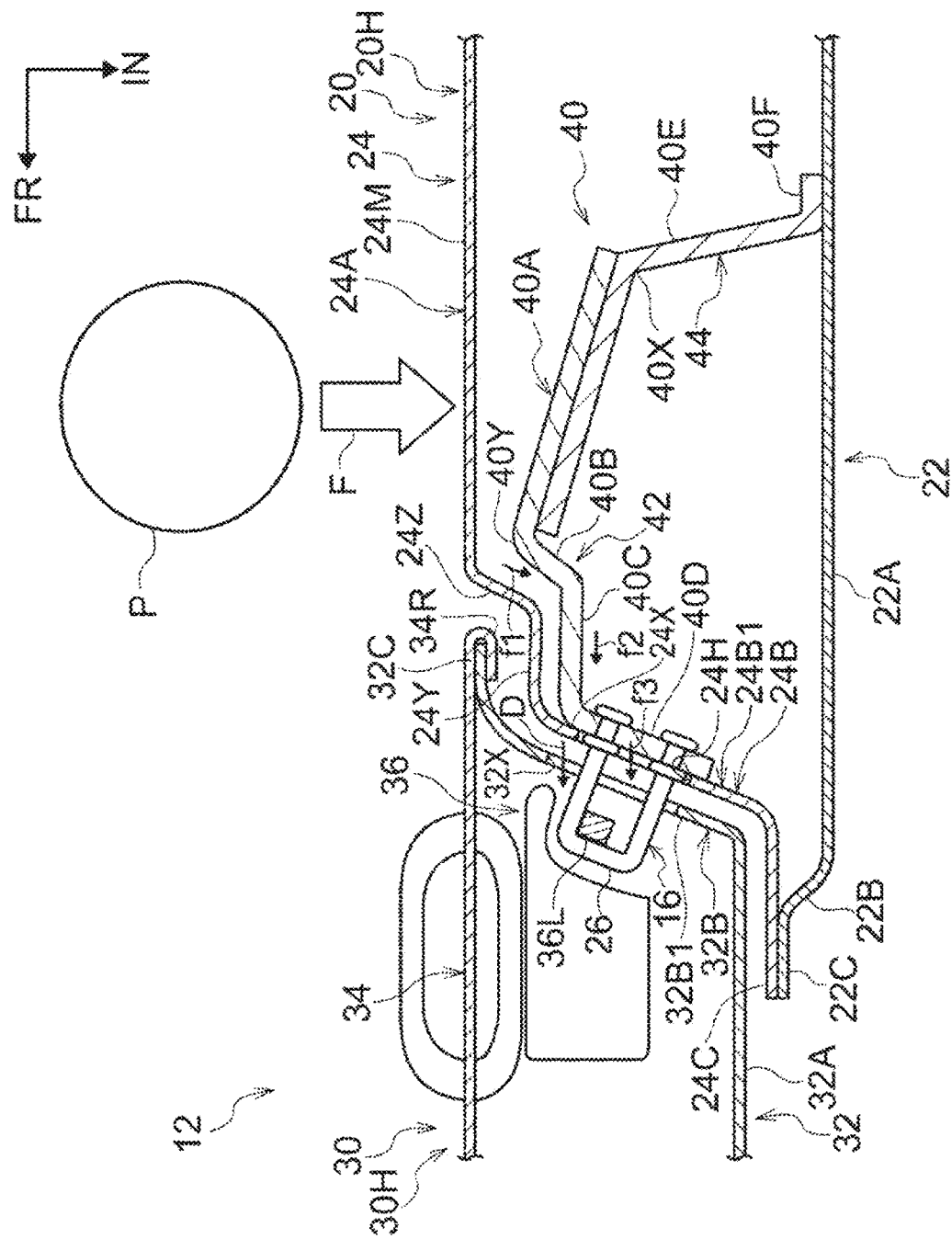
FIG. 2 is an enlarged sectional view showing an enlarged state of the vehicle door structure that is cut along line II-II of FIG. 1.

FIG. 2 is an enlarged sectional view showing an enlarged state of the vehicle door structure that is cut along line II-II of FIG. 1. The front sliding door 30 shown in FIG. 2 includes a door body 30H defining a closed section with a door inner panel 32 and a door outer panel 34. The door inner panel 32 is disposed on the vehicle cabin inner side of the front sliding door 30 to constitute a door inner plate, and the door outer panel 34 is disposed on the vehicle cabin outer side of the door inner panel 32 to constitute a door outer plate.

The door outer panel 34 is formed in a flat plate shape as a whole except for a part in a peripheral edge portion 34R. The door inner panel 32 has an inner side wall portion 32A facing the door outer panel 34. A door trim (not shown) is disposed on the surface of the inner side wall portion 32A on the vehicle cabin inner side. Further, the door inner panel 32 includes a peripheral wall portion 32B extending from the peripheral edge portion of the inner side wall portion 32A toward the door outer panel 34 side, and a flange portion 32C protruding from the end portion of the peripheral wall portion 32B on the door outer panel 34 side. A peripheral edge portion 34R of the door outer panel 34 is fixed to the flange portion 32C of the door inner panel 32 by hemming.

A rear wall portion 32B1 constituting a portion of the peripheral wall portion 32B on the vehicle rear side is inclined to the rear side of the vehicle toward the vehicle cabin outer side. The rear wall portion 32B1 has a hole 32X that penetrates through the rear wall portion 32B1 and that allows a striker 26 serving as an engaging member, which will be described later, to enter and exit through the hole 32X.

Further, a lock device 36 (schematically shown in the drawing) is provided at the rear portion on the inner side of the front sliding door 30. The lock device 36 is configured to include a latch 36L as an engaged member. The latch 36L is displaceable between a locked position where the latch 36L is engaged with the striker 26 (described later) and an unlocked position where the latch 36L is disengaged from the striker 26, and is engaged with the striker 26 when both the rear sliding door 20 and the front sliding door 30 are closed and stopped.

On the other hand, the rear sliding door 20 includes a door body 20H defining a closed section with a door inner panel 22 and a door outer panel 24. The door inner panel 22 is disposed on the vehicle cabin inner side of the rear sliding door 20 to constitute a door inner plate, and the door outer panel 24 is disposed on the vehicle cabin outer side of the door inner panel 22 to constitute a door outer plate.

The door inner panel 22 includes a vehicle cabin side vertical wall portion 22A extending along the vehicle front-rear direction and a vehicle up-down direction to constitute the inner surface of the door. The vehicle cabin side vertical wall portion 22A is covered by a door trim (not shown) on the vehicle cabin inner side. Further, the door inner panel 22 includes a peripheral wall portion 22B shortly extending from the peripheral edge portion of the vehicle cabin side vertical wall portion 22A toward the door outer panel 24 side, and a flange portion 22C protruding from the end portion of the peripheral wall portion 22B on the door outer panel 24 side.

The door outer panel 24 has a vehicle cabin outer side vertical wall portion 24A facing the vehicle cabin side vertical wall portion 22A of the door inner panel 22. Further, the door outer panel 24 includes a peripheral wall portion 24B extending from the peripheral edge portion of the vehicle cabin outer side vertical wall portion 24A toward the door inner panel 22 side, and a flange portion 24C protruding from the end portion of the peripheral wall portion 24B on the door inner panel 22 side. The flange portion 24C of the door outer panel 24 and the flange portion 22C of the door inner panel 22 are overlapped and joined to each other in the door thickness direction of the rear sliding door 20.

A front side portion 24B1 constituting the vehicle front side portion of the peripheral wall portion 24B is formed in a substantially crank shape in a closed sectional view so as to match the shape of the rear portion of the front sliding door 30. Specifically, first, the front side portion 24B1 has a first front wall portion 24X that includes a portion that is inclined to the vehicle rear side from the rear end of the flange portion 24C toward the vehicle cabin outer side and that is disposed to face the rear wall portion 32B1 of the front sliding door 30. Further, the front side portion 24B1 has a second front wall portion 24Z that is inclined to the vehicle front side toward the vehicle cabin inner side from the front end of the vehicle cabin outer side vertical wall portion 24A on the vehicle cabin outer side and the vehicle rear side with respect to the first front wall portion 24X. The second front wall portion 24Z constitutes an end portion of the front side portion 24B1 on the vehicle cabin outer side. Further, the end portion of the first front wall portion 24X on the vehicle cabin outer side and the end portion of the second front wall portion 24Z on the vehicle cabin inner side are connected by a connecting portion 24Y extending along the door width direction of the rear sliding door 20 (a right-left direction when the door is viewed from the front).

The first front wall portion 24X serving as a part of the outer edge portion of the door body 20H of the rear sliding door 20 has a hole 24H that penetrates through the first front wall portion 24X and the striker 26 protruding from the hole 24H. That is, in the present embodiment, the striker 26 is provided in the end portion side of the rear sliding door 20 in the left direction as viewed in the front view of the rear sliding door 20 (a direction that can be understood as one direction of the up, down, left, and right directions, and is hereinafter appropriately abbreviated as "door left direction"). Further, an engagement direction D of the striker 26 with the latch 36L is set to be a direction along the door left direction. Together with the lock device 36 described above, the striker 26 constitutes a door lock mechanism 16 that locks the front sliding door 30 and the rear sliding door 20 at the intermediate portion of the door opening 14 (see FIG. 1) in the vehicle front-rear direction. The door lock mechanism 16 of the present embodiment is an element that is also understood as a center lock mechanism. Since a known door lock mechanism can be applied to the door lock mechanism 16, detailed description thereof will be omitted.

The striker 26 is formed in a U shape in a vehicle plan view, and is engaged with the latch 36L of the lock device 36 to hold the rear sliding door 20 in the closed and stopped state. The base end side of the striker 26 is fixed to a portion of a load transmitting member 40 that is disposed on the base end side of the striker 26. For example, the base end side of the striker 26 is fixed to an end wall portion 40D of the load transmitting member 40 provided on the interior of the door body 20H of the rear sliding door 20 by clinching.

The load transmitting member 40 is made of metal and is formed in a bent plate shape. For example, the load transmitting member 40 is composed of two members, a first plate member 42 and a second plate member 44, and a part of the first plate member 42 and a part of the second plate member 44 are overlapped with each other and joined to each other by spot welding or the like. The first plate member 42 and the second plate member 44 are members having sufficiently higher strengths than the surrounding metal plate members (that is, the door inner panel 22 and the door outer panel 24) in the entire area thereof. The load transmitting member 40 is a member having a plan sectional shape extending in the vehicle up-down direction as shown in FIG. 2, and for example, is a thin and long member extending in the vehicle up-down direction as simply shown in FIG. 1. The size and set position of the load transmitting member 40 in the vehicle up-down direction shown in FIG. 1 are examples.

As shown in FIG. 2, the end wall portion 40D that is a part of the load transmitting member 40 and that is disposed on the base end side of the striker 26, is provided on the end portion side on the interior of the door body 20H in the door left direction and is joined to the first front wall portion 24X by welding as an example. The end wall portion 40D is used for inputting a load to the base end side of the striker 26 and faces the latch 36L side.

The load transmitting member 40 includes a first wall portion 40A disposed at a position that overlaps with a design surface 24M on the vehicle cabin outer side of the door outer panel 24 of the rear sliding door 20 in a front view of the rear sliding door 20. An example of the first wall portion 40A is a portion where the first plate member 42 and the second plate member 44 described above are overlapped and joined to each other. In the present embodiment, almost the entire area of the first wall portion 40A is an overlapping portion of the first plate member 42 and the second plate member 44.

The first wall portion 40A is inclined toward the vehicle cabin outer side in the door left direction of the rear sliding door 20, and is configured to include a portion further on the vehicle cabin outer side than the end wall portion 40D in the door thickness direction of the rear sliding door 20.

Further, the first wall portion 40A is configured such that, when a load F is input from the vehicle cabin outer side, a first end portion 40X that is the end portion of the rear sliding door 20 in the right direction in the front view of the rear sliding door 20 (the direction opposite to the door left direction, hereinafter appropriately abbreviated as "door right direction") serves as a support point.

The load transmitting member 40 includes a fourth wall portion 40E and a flange portion 40F to support the first end portion 40X. The fourth wall portion 40E is bent from the first end portion 40X of the first wall portion 40A to the vehicle cabin inner side, extends to the vehicle cabin side vertical wall portion 22A of the door inner panel 22, and is slightly inclined in the door right direction (vehicle rear side) toward the vehicle cabin inner side. Further, the flange portion 40F is bent from the end portion of the fourth wall portion 40E on the vehicle cabin inner side to the door right direction (vehicle rear side) and joined to the vehicle cabin side vertical wall portion 22A of the door inner panel 22. With this configuration, the first end portion 40X of the first wall portion 40A is supported by the vehicle cabin side vertical wall portion 22A of the door inner panel 22 via the fourth wall portion 40E and the flange portion 40F, and is disposed further on the door outer panel 24 side than the center position in the door thickness direction on the interior of the door body 20H of the rear sliding door 20.

The second wall portion 40B extends from the second end portion 40Y, which is the end portion of the first wall portion 40A in the door left direction, so as to be inclined in the door left direction toward the vehicle cabin inner side. The angle between the surface of the first wall portion 40A facing the vehicle cabin inner side and the surface of the second wall portion 40B in the door right direction (facing the vehicle rear side) is set to an obtuse angle in the present embodiment. The end portion of the second wall portion 40B on the vehicle cabin inner side and the end portion of the end wall portion 40D on the vehicle cabin outer side are connected by a third wall portion 40C. The third wall portion 40C extends along the door left direction (in other words, the vehicle front-rear direction) of the rear sliding door 20. The second wall portion 40B can also be understood as a portion connecting the second end portion 40Y of the first wall portion 40A and the end portion of the third wall portion 40C in the door right direction in a stepped shape.

The load transmitting member 40 having the above configuration is configured to transmit a load F toward the base end side of the striker 26 and apply a load to the base end side of the striker 26 in the engagement direction D of the striker 26 with the latch 36L, when the load F is input in the direction perpendicular to the design surface 24M on the vehicle cabin outer side of the door outer panel 24 of the rear sliding door 20.

Operations and Effects of Embodiment

Next, operations and effects of the present embodiment will be described.

When a colliding body P (pole, electric pole, tree, etc.) collides with the rear sliding door 20 from the vehicle cabin outer side and the load F is input in the direction perpendicular to the design surface 24M on the vehicle cabin outer side of the door outer panel 24, the load transmitting member 40 transmits the load F toward the base end side of the striker 26 and applies a load to the base end side of the striker 26 in the engagement direction D of the striker 26 with the latch 36L. Thus, when the colliding body P collides with the rear sliding door 20 from the vehicle cabin outer side, it is possible to effectively suppress the load from acting in the direction of disengaging the striker 26 from the latch 36L. Therefore, the deformation of the rear sliding door 20 on the engaging portion side is suppressed.

More specifically, the first wall portion 40A of the load transmitting member 40 is disposed at a position that overlaps with the design surface 24M on the vehicle cabin outer side of the door outer panel 24 of the rear sliding door 20 in the front view of the rear sliding door 20. Thus, when the load F in the direction perpendicular to the design surface 24M on the vehicle cabin outer side of the door outer panel 24 of the rear sliding door 20 is input, the load F at that time is input from the vehicle cabin outer side vertical wall portion 24A of the door outer panel 24 to the first wall portion 40A. Here, the first wall portion 40A is configured to be inclined toward the vehicle cabin outer side in the door left direction, and configured such that, when the load F is input from the vehicle cabin outer side, the first end portion 40X, which is the end portion in the direction opposite to door left direction, serves as a support point. Therefore, when a load is input from the door outer panel 24 to the first wall portion 40A, the first wall portion 40A is likely to rotate with the first end portion 40X serving as a support point (see arrow f1), so that the end portion of the first wall portion 40A in the door left direction is likely to move in the door left direction while moving toward the vehicle cabin inner side.

The first wall portion 40A that is likely to rotate in this way is configured to include a portion further on the vehicle cabin outer side than the end wall portion 40D of the load transmitting member 40 in the door thickness direction of the rear sliding door 20. Further, the second wall portion 40B of the load transmitting member 40 is inclined in the door left direction toward the vehicle cabin inner side from the second end portion 40Y, which is the end portion of the first wall portion 40A in the door left direction. The third wall portion 40C of the load transmitting member 40 connects the end portion of the second wall portion 40B on the vehicle cabin inner side and the end portion of the end wall portion 40D on the vehicle cabin outer side, and extends along the door left direction. Thus, a load (see arrow f2) in the door left direction acts on the third wall portion 40C from the first wall portion 40A via the second wall portion 40B, and a load (see arrow f3) in the door left direction acts on the base end side of the striker 26 from the third wall portion 40C via the end wall portion 40D. Here, since the engagement direction D of the striker 26 with the latch 36L is set in the direction along the door left direction, by applying a load to the base end side of the striker 26 in the door left direction as described above, a load can be applied to the base end side of the striker 26 in the engagement direction D.

Despite such a relatively simple configuration, when the colliding body P collides with the rear sliding door 20 from the vehicle cabin outer side, the collision load at that time can be efficiently applied to the base end side of the striker 26 with the load transmitting member 40.

Further, in the present embodiment, since the base end side of the striker 26 is fixed to the end wall portion 40D, when the colliding body P collides with the rear sliding door 20 from the vehicle cabin outer side, the load can be more stably applied from the load transmitting member 40 to the base end side of the striker 26.

Further, in the present embodiment, the first end portion 40X of the first wall portion 40A is supported by the vehicle cabin side vertical wall portion 22A of the door inner panel 22 via the fourth wall portion 40E and the flange portion 40F, and thus functions as a support point when the load F in a direction perpendicular to the design surface 24M on the vehicle cabin outer side of the door outer panel 24 is input. Here, the first end portion 40X of the first wall portion 40A is disposed not on the door inner panel 22 side but on the door outer panel 24 side on the interior of the door body 20H, and the entire first wall portion 40A is disposed on the door outer panel 24 side. Therefore, when the colliding body P collides with the rear sliding door 20 from the vehicle cabin outer side, the collision load at that time can be easily and quickly applied to the first wall portion 40A.

Further, in the present embodiment, when both the rear sliding door 20 and the front sliding door 30 are in the closed and stopped state, the striker 26 provided on the rear sliding door 20 and the latch 36L provided on the front sliding door 30 are engaged with each other. Here, the engaging force between the striker 26 and the latch 36L is not necessarily high, but even with such a structure, when the colliding body P collides with the rear sliding door 20 from the vehicle cabin outer side, the above-described load transmission by the load transmitting member 40 suppresses the engaging portion side of the rear sliding door 20 from deforming.

Further, in the present embodiment, the load transmitting member 40 is composed of two members, and an example of the first wall portion 40A is a portion where the two members are overlapped and joined to each other. Therefore, the load transmitting member 40 can be easily manufactured, and can easily suppress the first wall portion 40A from deforming when the colliding body P collides with the rear sliding door 20 from the vehicle cabin outer side. Therefore, the operations of load transmission by the load transmitting member 40 described above can be satisfactorily realized.

As described above, according to the vehicle door structure of the present disclosure, the deformation of the engaging portion side of the rear sliding door 20 can be suppressed when the colliding body P collides with the rear sliding door 20 from the vehicle cabin outer side.

Supplementary Description of Embodiment

As a modification of the above embodiment, the door in which the load transmitting member is provided on the interior of the door body may be a door other than the sliding door such as a hinge door. Further, the door in which the load transmitting member is provided on the interior of the door body may be, for example, a back door (rear door of the vehicle) instead of the side door (side door of the vehicle).

Further, as a modification of the above embodiment, the lock device 36 configured to include the latch 36L as the engaged member may be provided on a pillar disposed along the vehicle up-down direction on the edge of the door opening 14.

Further, as a modification of the above embodiment, the load transmitting member may be configured to have a wall portion that linearly connects the end portion of the end wall portion 40D on the vehicle cabin outer side and the end portion of the first wall portion 40A in the door left direction instead of the second wall portion 40B and the third wall portion 40C of the load transmitting member 40 of the above embodiment.

Further, as a modification of the above embodiment, the configuration may be such that the striker (engaging member) 26 is provided on the end portion side of the door in any one direction of the right direction, the upward direction, and the downward direction as viewed in the front view of the door, and the load transmitting member 40 is provided at a position where the same operations and effects as the above embodiment can substantially be obtained. That is, in the above embodiment, the case where the "one direction" is the left direction has been described as an example, but the configuration may be such that the "one direction" is one of the right direction, the upward direction, and the downward direction. As a supplementary description, the door (rear sliding door) 20, the striker (engaging member) 26, the load transmitting member 40, and the latch (engaged member) 36L may be set so as to be disposed at positions where the direction of the arrow FR in FIG. 2 is replaced with one of the vehicle rear side, the vehicle upper side, and the vehicle lower side.

Further, as a modification of the above embodiment, the configuration can be such that the first end portion 40X of the first wall portion 40A is fixed to the vehicle cabin side vertical wall portion 22A of the door (rear sliding door) 20 so as to be in contact with the vehicle cabin side vertical wall portion 22A of the door (rear sliding door) 20.

Further, as a modification of the above embodiment, for example, the configuration may be such that the base end side of the engaging member is not fixed to the load transmitting member, but the load transmitting member is disposed so that a part of the load transmitting member overlaps with a plate to which the base end side of the engaging member is fixed, whereby the load F input to the design surface on vehicle cabin outer side of the door can be transmitted from the load transmitting member to the base end side of the engaging member.

Further, as a modification of the above embodiment, the load transmitting member may be composed of a single member.

The embodiment described above and the modifications described above can be combined with each other as appropriate to be implemented.

Although an example of the present disclosure has been described above, it goes without saying that the present disclosure is not limited to the above example, and various modifications other than the above can be carried out without departing from the spirit of the present disclosure.

What is claimed is:

1. A vehicle door structure comprising:
a door having a door body defining a closed section with a door inner panel and a door outer panel and configured to open and close a door opening of a vehicle;
an engaging member provided on an outer edge portion of the door body and configured to hold the door in a closed and stopped state by engaging with an engaged member, each of the engaging member and the engaged member being a part of a door locking mechanism; and
a load transmitting member configured to, when a load in a direction perpendicular to a design surface on a vehicle cabin outer side of the door outer panel is input, transmit the load toward a base end side of the engaging member and apply a load to the base end side of the engaging member in an engagement direction of the engaging member with the engaged member, the load transmitting member being provided on an interior of the door body such that a part of the load transmitting member is disposed on the base end side of the engaging member.

2. The vehicle door structure according to claim 1 further comprising:
a second sliding door disposed adjacent to the door that is a first sliding door and configured to open and close the door opening together with the first sliding door, wherein:
the second sliding door is provided with the engaged member; and
the engaged member and the engaging member are configured to be engaged with each other when both the first sliding door and the second sliding door are in the closed and stopped state.

3. The vehicle door structure according to claim 1, wherein:
the engaging member is provided on an end portion side of the door in one direction of an upward direction, a downward direction, a left direction, and a right direction in a front view of the door, and the engagement direction is set to coincide with the one direction;
the load transmitting member includes an end wall portion, a first wall portion, a second wall portion, and a third wall portion;
the end wall portion is provided on an end portion side on the interior of the door body in the one direction and is disposed on the base end side of the engaging member, and is used for inputting the load to the base end side of the engaging member and facing the engaged member;
the first wall portion is configured such that a first end portion that is an end portion in a direction opposite to the one direction serves as a support point when a load is input from the vehicle cabin outer side;
the second wall portion extends so as to be inclined in the one direction toward a vehicle cabin inner side from a second end portion that is an end portion of the first wall portion in the one direction; and
the third wall portion connects an end portion of the second wall portion on the vehicle cabin inner side and an end portion of the end wall portion on the vehicle cabin outer side, and extends along the one direction.

4. The vehicle door structure according to claim 3, wherein the first wall portion is disposed at a position that overlaps with the design surface on the vehicle cabin outer side of the door outer panel in a front view of the door.

5. The vehicle door structure according to claim 3, wherein the first wall portion is inclined toward the vehicle cabin outer side in the one direction and is configured to include a portion further on the vehicle cabin outer side than the end wall portion in a door thickness direction of the door.

6. The vehicle door structure according to claim 1, wherein the base end side of the engaging member is fixed to a portion of the load transmitting member disposed on the base end side of the engaging member.

7. The vehicle door structure according to claim 3, wherein:
the load transmitting member includes a fourth wall portion that is bent from the first end portion of the first wall portion toward the vehicle cabin inner side and that extends to a vehicle cabin side vertical wall portion of the door inner panel and a flange portion that is bent from an end portion of the fourth wall portion on the vehicle cabin inner side and that is joined to the vehicle cabin side vertical wall portion; and
the first end portion is supported by the vehicle cabin side vertical wall portion via the fourth wall portion and the flange portion and is disposed on a door outer panel side on the interior of the door body.

8. The vehicle door structure according to claim 7, wherein:
the load transmitting member is composed of two members; and
the first wall portion is a portion where the two members are overlapped and joined to each other.

9. The vehicle door structure according to claim 3, wherein the first end portion is in contact with a vehicle cabin side vertical wall portion of the door inner panel and is fixed to the vehicle cabin side vertical wall portion of the door inner panel.

10. The vehicle door structure according to claim 3, wherein the base end side of the engaging member is fixed to the end wall portion.

* * * * *